United States Patent [19]

Ockels

[11] Patent Number: 4,965,886
[45] Date of Patent: Oct. 30, 1990

[54] PRESSURIZED SPACESUIT FITTED WITH VARIABLE PRESSURE GLOVES FOR IMPROVED DEXTERITY

[75] Inventor: Wubbo Ockels, An Maastricht, Netherlands

[73] Assignee: Agence Spatiale Europeenne, Paris, France

[21] Appl. No.: 337,331

[22] Filed: Apr. 13, 1989

[30] Foreign Application Priority Data

Apr. 27, 1988 [FR] France ................................ 88 05609

[51] Int. Cl.⁵ ................................................ A62B 17/00
[52] U.S. Cl. ....................................... 2/2.1 A; 2/2.1 R
[58] Field of Search .................... 2/2, 2.1 A, 2.1 R, 16, 2/22, 159, 160, 162, DIG. 3, DIG. 7, 170, 270; 128/400, 402, 40

[56] References Cited

U.S. PATENT DOCUMENTS

| | | | |
|---|---|---|---|
| 1,399,095 | 12/1921 | Webb | 128/402 |
| 2,939,148 | 6/1960 | Hart | 2/2.1 R |
| 3,000,014 | 9/1961 | White | 2/2.1 A |
| 3,363,266 | 1/1968 | Swet | 2/2.1 R |
| 3,412,730 | 11/1968 | MacLeod | 128/40 |
| 3,504,984 | 4/1970 | Bush | 2/2.1 R |
| 3,548,819 | 12/1970 | Davis | 128/402 |
| 3,568,209 | 3/1971 | O'Neill | 2/2.1 R |
| 3,675,244 | 7/1972 | Mayo | 2/2.1 R |
| 4,077,218 | 3/1978 | Humphrey | 2/2.1 R |
| 4,146,933 | 4/1979 | Jenkins | 2/2.1 A |
| 4,174,710 | 11/1979 | Pampuch | 2/2.1 R |
| 4,229,832 | 10/1980 | Dickson | 2/2.1 R |
| 4,479,268 | 10/1984 | Tillbrook | 2/2.1 R |

FOREIGN PATENT DOCUMENTS

| | | | |
|---|---|---|---|
| 2751344 | 5/1978 | Fed. Rep. of Germany | 2/2.1 R |
| 1182262 | 6/1959 | France | 2/2.1 R |
| 1420473 | 11/1965 | France | 2/2.1 R |
| 2258137 | 8/1975 | France | 2/2.1 R |
| 577101 | 5/1946 | United Kingdom | 2/2.1 R |
| 954988 | 4/1964 | United Kingdom | 2/2.1 R |
| 2133274 | 7/1984 | United Kingdom | 2/2.1 R |

Primary Examiner—Werner H. Schroeder
Assistant Examiner—Diana L. Biefeld
Attorney, Agent, or Firm—Bell, Seltzer, Park & Gibson

[57] ABSTRACT

The present invention relates to a pressurized suit (10) fitted with elastic gloves (1) and co-operating with respective devices (20) for reducing the pressure ($P_M$) inside each glove relative to the pressure ($P_C$) inside the suit (10) in order to increase manual dexterity of the astronaut. Each device includes an inflatable elastic cuff (30) which is disposed between the glove (1) and the remainder of the suit (10) together with means for pressurizing the cuff (30), said means being constituted by a micro-pump (40) which sucks air from inside the glove (1) and delivers it into the deformable chamber (31) of the cuff (30), together with a control valve (50a) for controlling the pressure ($P_j$) inside the cuff (30). The invention is applicable to extra-vehicular activity (EVA).

4 Claims, 2 Drawing Sheets

PRESSURIZED SPACESUIT FITTED WITH VARIABLE PRESSURE GLOVES FOR IMPROVED DEXTERITY

The present invention relates to a pressurized spacesuit fitted with variable pressure gloves for improved dexterity.

BACKGROUND OF THE INVENTION

Astronauts are protected from the hostile environment of space by means of special clothing given the general name pressurized spacesuits. Such suits have in common the function of protecting an astronaut from the effects of extreme temperatures, while dumping metabolically-generated heat and providing a constant supply of air for breathing. However, such suits also have in common the drawback of very severely limiting the dexterity of astronauts when handling objects, and in general when interacting with the environment.

In order to provide a comfortable environment for an astronaut, two different approaches have been followed. The first approach consists in making rigid pressurized suits made up of rigid cylinders for containing air and interconnected by joints enabling relative motion of the astronaut's limbs, with the limbs and the body being encased in rigid and substantially cylindrical elements.

The second approach seeks to provide flexible pressurized suits constituting an airtight covering that fits the astronaut's body.

However, both rigid and flexible spacesuits suffer from drawbacks due to the requirement that astronauts should not do thermal dynamic work on the air that surrounds them whenever they move:

in rigid spacesuits, this means that the joints must be "constant-volume" joints; and in flexible pressurized spacesuits this means that cables or other equivalent means must be provided to limit spacesuit movement.

These drawbacks are especially severe in gloves. It is particularly difficult to make constant-volume joints that are as small as knuckle joints, and as a result it still remains difficult for astronauts to perform accurate manual tasks.

There thus exists a particular need in this field for pressurized gloves for astronauts providing improved dexterity, i.e. improved tactile feedback, and thereby extending the range of handling operations that can be performed, and this implies that gloves must be lightweight in design and easy to use while nevertheless being economically viable.

One principle for developing a glove to satisfy the above-mentioned requirements for use in a pressurized spacesuit, was proposed towards the end of the 1960s. This principle consists in counterbalancing the internal pressure of the tissues of the human body by mechanical means which replace the pressure exerted by air, be that the air to which the human body is normally subject on Earth or the air that exists inside a pressurized suit. The mechanical means are not specified a priori.

A spacesuit glove proposed in the prior art based on this principle is an elastic skin-tight glove which presses against the skin of the astronaut's hand (sometimes called a "skinsuit" glove), and the glove is designed so that the pressure applied to the astronaut's hand by the elastic tightness of the glove is substantially equal to the pressure that would be exerted on the hand by air in a conventional pressurized suit. This prior art glove is thus based on the concept of "elastic pressurization" and enables hybrid pressurized suits to be made, i.e. suits in which the body of an astronaut is pressurized in conventional manner whereas the hands are pressurized by means of elastic gloves as described above. To this end, a hybrid spacesuit includes an interface between that portion of the body which is pressurized normally and each hand which is pressurized elastically (further detail on the prior art technique can be found from the scientific article "Advanced spacesuit glove design" published in 1985 by the Massachusetts Institute of Technology and NASA, in IAA Conference Proceedings issue 12, pages 469 to 488).

However, although an astronaut's manual dexterity is considerably improved by elastic gloves compared with conventional pressurized suits, it is clear that this dexterity is far from being comparable to that which an astronaut would have with bare hands, which is naturally the ideal situation.

U.S. Pat. No. 3,363,266 discloses an internally pressurized spacesuit comprising means for increasing the mobility of a limb portion, such as an arm section adapted to receive the arm of a wearer of the suit, with the wearer's hand being enclosed within a pressurized glove. These means comprise an annular seal of stretchable material and a plug valve applied on the arm section. The seal separates a chamber defined in the arm section from the remainder of the suit, and the valve puts the chamber into communication with the remainder of the suit under normal conditions, or with the space environment (thus depressurizing the chamber) when a need exists for facilitating flexing of the arm section including the glove. The seal is attached both to the arm section including the glove and to a sleeve surrounding the remainder of the wearer's arm, and the seal is compressed in response to the pressure differential between the chamber and the remainder of the suit.

However, this prior solution suffers from several drawbacks, including the need for the pressure in the chamber and the glove to be restored periodically so as to relax the seal about the arm and reestablish proper blood circulation, and also the existence of potential safety hazards due to the undesirable physiological effects produced by the near vacuum which may occur in the chamber and the glove in the event of failure of a backpressure valve provided for maintaining a residual pressure differential between the space environment and the chamber.

The object of the present invention is thus to provide a pressurized suit fitted with elastic gloves suitable for imparting improved dexterity to the hands of an astronaut and constituting and acceptable compromise between the two extreme conditions represented by the hands of the astronauts being subjected to the same pressure as the remainder of the body or else to no pressure. The solution provided to this end by the present invention is based on the present physiological understanding that astronauts can work for relatively long periods of time with their hands at a lower pressure than the remainder of their bodies, and it also takes account of the fact that astronauts require improved dexterity only when performing special tasks e.g. when handling small-sized objects such as pliers, screwdrivers, etc., or when handling electrical apparatuses, e.g. setting up electrical connections, and in general handling electrical cables. In contrast, such high dexterity is not required when performing operations on large-sized structures.

SUMMARY OF THE INVENTION

The present invention provides a pressurized suit fitted with elastic gloves communicating, under normal conditions, with the inside of the remainder of the suit which is filled with air at a pressure equal to that which should be applied to the body of an astronaut under conditions of physiological equilibrium, each glove co-operating with a pressure-reducing device for reducing the pressure inside the glove relative to the pressure inside the suit in order to increase the dexterity of the astronaut's hands, each of said devices comprising an elastic seal which is disposed between one of the gloves and the remainder of the suit around a corresponding wrist of the astronaut, functional clearance existing under normal conditions between the inside wall of each seal and the corresponding wrist, thereby enabling intercommunication between the glove and the remainder of the suit under said normal conditions, each of said devices including the improvements whereby:

the seal which is disposed around an annular zone corresponding to the astronaut's wrist and which is fixed both to the glove and to the remainder of the suit, is constituted by an inflatable cuff;

the device further includes means for inflating the cuff, said means being constituted by a micro-pump which sucks air from inside the glove and delivers it into the inflatable cuff, thereby putting it under pressure; and the device further includes a control valve for controlling the pressure inside the cuff.

In a preferred embodiment of this spacesuit, each of the above-mentioned pressure-reducing devices also includes a control valve for controlling the micro-pump, said valve switching on the pump when the pressure inside the glove exceeds a predetermined minimum value corresponding to the desired degree of dexterity, and switching off the pump when said minimum value is reached.

In addition to the dispositions specified above, the invention covers further dispositions which appear from the following description.

BRIEF DESCRIPTION OF THE DRAWINGS

Embodiments of the invention are described by way of example with reference to the accompanying drawings, in which.

DETAILED DESCRIPTION

Figure 1:
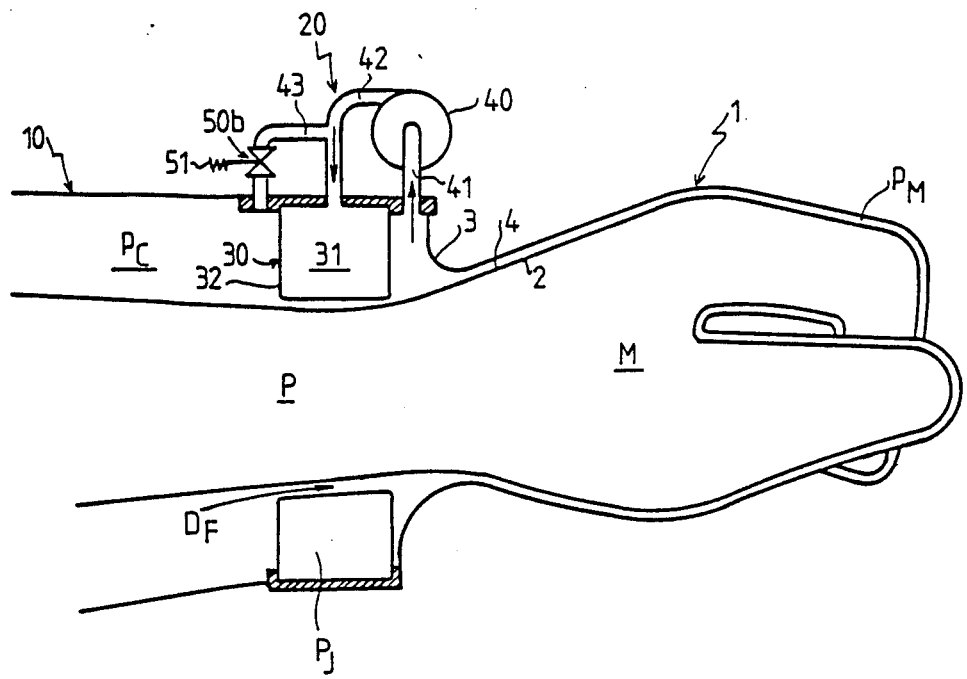
FIG. 1 is a diagram of one embodiment of a device for reducing glove pressure and incorporated in a pressurized spacesuit.

Reference numeral 1 designates a glove for a pressurized suit. The glove is made of an elastic material and has a wall 3 which together with the skin 2 of an astronaut's hand M delimits a narrow space 4 filled with air at a pressure which is normally equal to the physiological pressurization value $P_C$ of the astronaut's body (not shown). To this end, the space 4 communicates with the remainder of the pressurized suit 10 which contains air at the pressure $P_C$ (only a small portion of the remainder of the spacesuit is shown at its interface with the glove).

Reference numeral 20 designates a device for varying the pressure inside the glove, i.e. the pressure existing in the space or chamber 4, and the device is intended, in particular, to reduce the pressure inside the glove to a value $P_M$ which is less than the above-specified value $P_C$. In this way, it is possible to satisfy the following two contradictory requirements:

(i) it is necessary for the pressure inside the pressurized suit to be relatively high for physiological reasons; and (ii) reduced pressure is required, in particular in the gloves of the suit, in order to improve the manual dexterity of the astronaut.

To this end, the device 20 for adjusting the pressure inside the glove 1 includes an inflatable cuff 30 constituted by a toroidal chamber 31 delimited by a deformable wall 32. This cuff is fixed to the wall 3 of the glove 1 and also to the remaining portion of the pressurized suit 10, and it is disposed around the wrist P of the astronaut.

Under normal conditions, the cuff 30 leaves functional clearance around the astronaut's wrist P for the pressure $P_M$ existing inside the glove to be equal to the pressure $P_C$ existing inside the remainder of the pressurized suit 10.

This clearance can be eliminated in order to set up a barrier between the chamber 4 in the glove 1 and the inside of the remainder of the suit 10. To this end, the cuff 30 cooperates with a miniature pump (a micropump, in particular actuated by an electric motor which is likewise a miniature device: and electrical micromotor), and given reference numeral 40. This pump sucks the air from inside the glove chamber 4 and pumps it into the toroidal chamber 31 of the cuff 30 so as to set up a pressure $P_J$ therein which is greater than the pressure $P_C$.

The operation of the pressure-adjustment device 20 is easy to understand. As the pump 40 pumps air from the glove chamber 4 the pressure $P_J$ existing in the deformable chamber 31 increases until the cuff 30 put under pressure in this way begins to fit tightly around the astronaut's wrist. This is equivalent to saying that the glove 1 is then separated from the remaining portion of the suit 10. Under normal conditions, in contrast, the glove chamber is in communication with the remaining portion of the pressurized suit 10 and the pressure in both of them is $P_C$: in other words under normal conditions $P_M = P_C$.

When the glove is thus separated from the remainder of the suit, the pressure $P_M$ inside the glove drops due to the suction from the pump 40 which is in communication firstly with the glove 1 via a duct 41 and secondly with the deformable chamber 31 of the cuff 30 via a duct 42.

Given that the inside wall of the cuff 30 does not seal perfectly to the wrist of the astronaut even when disposed tightly thereabout due to the pressure $P_J$, the clearance between them is not zero, even under these conditions. This means that a leakage air flow begins to be established under the action of pump suction into the glove chamber 4 (with the leakage flow being illustrated by arrow $D_F$). In order to clarify the drawing and illustrate the operation of the device more clearly, the size of the small clearance responsible for the leakage flow $D_F$ is exaggerated, and likewise the size of the chamber 4 is also exaggerated. In other words, as the pressure $P_M$ drops, so the leakage flow rate $D_F$ increases, and this continues until the pressure $P_M$ stabilizes at some value less than $P_C$.

Given that the leakage flow rate is a function of the pressure $P_J$, the pressure $P_M$ can be adjusted by acting on the pressure $P_J$, and this pressure can be controlled by means of a valve 50a (FIGS. 2 and 3) or 50b (FIG. 1) for returning a portion of the air sucked from the glove 1 into the remaining portion of the pressurized suit 10. To this end, the valve is disposed on an auxiliary delivery duct 43 connecting the main delivery duct 42 to the pressurized suit 10. The valve for controlling the pressure in the cuff 30 when pressurized in this way may be disposed inside the suit (see reference 50a in FIG. 2) or else it may be disposed outside the suit (see reference 50b in FIG. 1). This control valve may be controlled manually by the astronaut acting on a control element 51.

Figure 2:
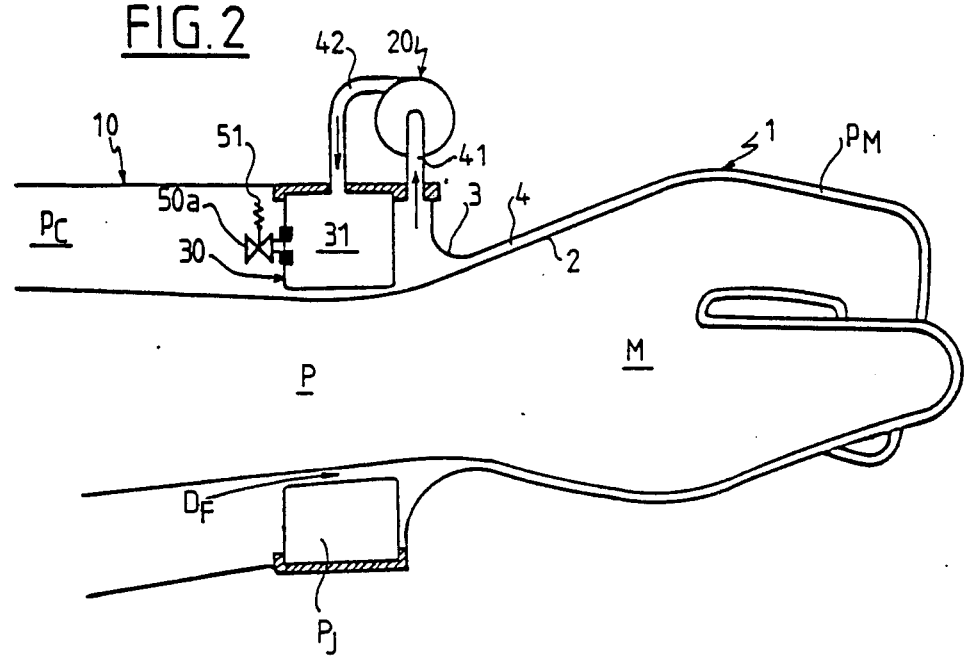
FIG. 2 shows a variant of FIG. 1.
Figure 3:
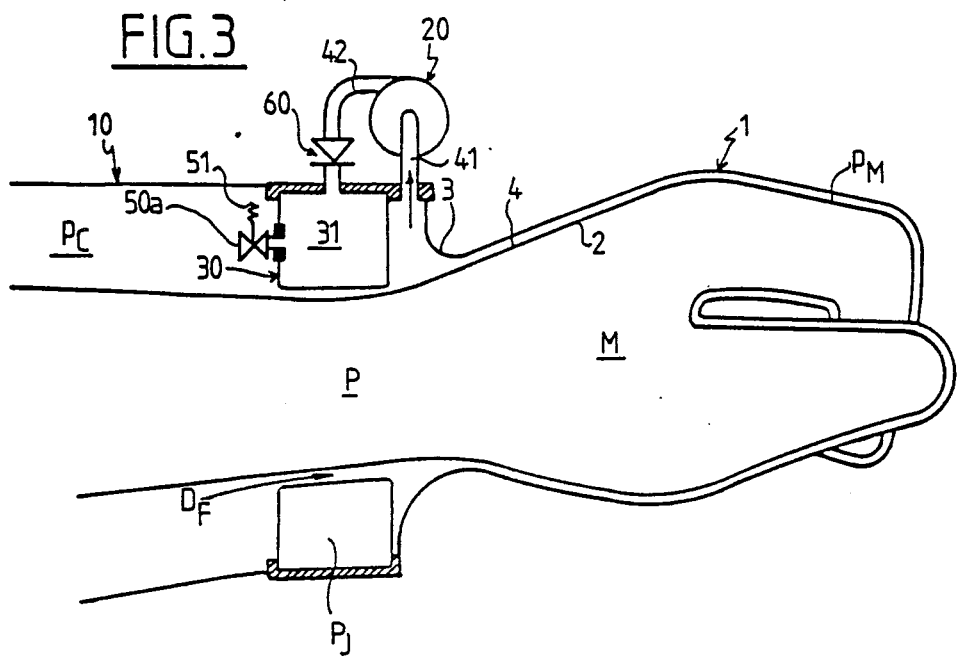
FIG. 3 shows another variant corresponding to a preferred embodiment.

FIG. 3 differs from FIGS. 1 and 2 in that the adjustment device 20 includes a valve 60 for controlling the pump. The pump is fitted with a pressure-sensitive control valve which switches it off when the pressure $P_M$ in the glove reaches a predetermined minimum value, which is a function of the degree of dexterity required by the astronaut. When the pressure $P_M$ exceeds this minimum value because of the leakage flow $D_F$, then the control valve causes the pump 40 to be switched on. This makes it possible to avoid having the pump running continuously.

The present invention thus proposes a pressurized suit having the following advantages:

(1) the pressure $P_C$ may be not less than 0.7 bars, thereby avoiding the need for "pre-breathing": i.e. the need for the astronauts to breathe oxygen for a certain period of time before undertaking any activity outside a space vehicle (EVA=Extra-Vehicular Activity), thereby avoiding decompression sickness, i.e. the ill effects due to a pressure unbalance; and (2) it imparts improved manual dexterity to an astronaut during EVA since the pressure $P_M$ is less than the pressure $P_C$, e.g. about 0.5 bars.

As can be seen from the above, the invention is not limited to the embodiments described in greater detail. On the contrary, it encompasses any variant which may occur to the person skilled in the art without going beyond the scope of the present invention. In particular, it should be underlined that the appearance and location in the drawings of the micro-pump unit are purely diagrammatic and intended essentially for illustrating the operation of the device for varying glove pressure. Also, the real disposition and size of such devices, and in particular of the pump, and also of the fixing between the device and the glove and between the device and the remainder of the suit are all design details within the competence of the person skilled in the art.

I claim:

1. A pressurized suit for an astronaut, said suit having at least one elastic glove disposed adjacent a wrist and a hand of the astronaut, said glove communicating under normal conditions with the interior of the remainder of said suit, said suit and said glove normally being filled with air at a first pressure equal to that which should be applied to the body of the astronaut under conditions of physiological equilibrium, a pressure-reducing device for reducing the pressure inside said glove relative to said first pressure inside said suit in order to increase dexterous use of the hand of the astronaut, said pressure-reducing device including an inflatable elastic cuff encircling the wrist of the astronaut and connected to said glove and to the remainder of said suit, said cuff under normal conditions providing functional clearance between the wrist of the astronaut and the thereto adjacent wall of said cuff sufficient to permit intercommunication between said glove and the remainder of said suit, said pressure-reducing device further including micro-pump means for inflating said cuff by withdrawing air from inside said glove and delivering at least part of said withdrawn air into said inflatable cuff and thereby putting said cuff under pressure, and said pressure-reducing device further including a control valve for controlling the pressure within said cuff.

2. A pressurized suit according to claim 1, wherein said pressure-reducing device also includes a second control valve for controlling said micro-pump, said second-mentioned control valve switching on said pump when the air pressure within said glove exceeds a predetermined minimum value providing the desired degree of dexterity of the hand of the astronaut, and said second-mentioned control valve switching off the pump when said minimum value is reached.

3. A pressurized suit as in claim 1, wherein said first-mentioned control valve is located outside of said suit.

4. A pressurized suit as in claim 1, wherein said first-mentioned control valve is located inside of said suit.

* * * * *

UNITED STATES PATENT AND TRADEMARK OFFICE
CERTIFICATE OF CORRECTION

PATENT NO. : 4,965,886

DATED : October 30, 1990

INVENTOR(S) : Wubbo Ockels

It is certified that error appears in the above-identified patent and that said Letters Patent is hereby corrected as shown below:

Title Page:
In the Abstract, line 13, "$(P_j)$" should be -- $(P_j)$ --.

Column 2, line 54, "and" (second occurrence) should be -- an --.

Column 4, line 32, "and" should be -- an --.

Signed and Sealed this

Fifth Day of January, 1993

*Attest:*

DOUGLAS B. COMER

*Attesting Officer*  Acting Commissioner of Patents and Trademarks